J. W. WHITTIC.
Car-Axle.
No. 205,324. Patented June 25, 1878.
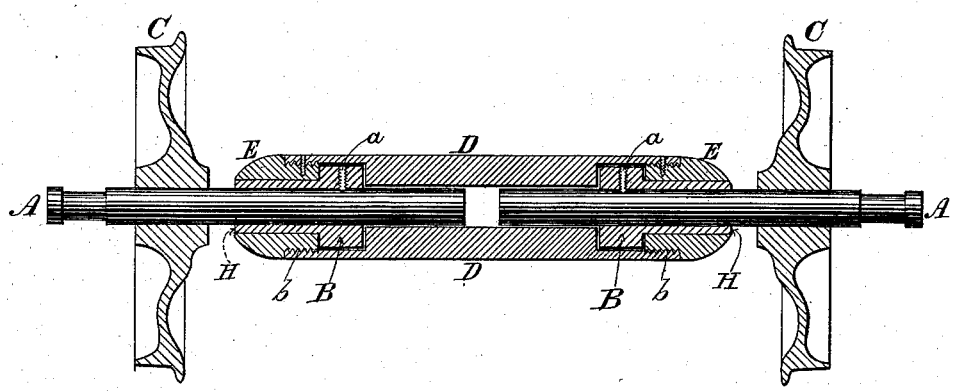
WITNESSES
INVENTOR

UNITED STATES PATENT OFFICE.

JOHN W. WHITTIC, OF SYRACUSE, NEW YORK.

IMPROVEMENT IN CAR-AXLES.

Specification forming part of Letters Patent No. 205,324, dated June 25, 1878; application filed February 13, 1878.

*To all whom it may concern:*

Be it known that I, JOHN W. WHITTIC, of Syracuse, in the county of Onondaga and State of New York, have invented a new and useful Improvement in Car-Axles, which is fully set forth in the following specification and accompanying drawing, which represents a longitudinal sectional view thereof.

The object of my invention is to enable the wheels to operate independently of each other, and thereby reduce the friction when the car is going around a curve, and so that the outer wheel can revolve faster than the inner one.

It is constructed as follows: Each wheel is mounted upon an axle or shaft, A, of about one-half the length required for a solid shaft between the wheels.

Upon this shaft a short hollow wearing-journal, H, having a collar, B, is placed in any suitable manner, and fastened at any desired point by the set-screw $a$.

C is an ordinary car-wheel. E is a hollow cylindrical head-piece and box, made of such internal diameter as to fit closely, yet loosely, over and around the hollow journal-bearing H. Upon the inner end is a shoulder, $b$, with a screw-thread cut thereon.

The outer surface of the collar B and of the journal H can be made with an anti-friction metal surface; but I prefer to have only that of the journal H so constructed.

The shape of this collar and journal is readily seen in the drawings.

The connection D is made of the shape shown in the drawings, and is bored through the central portion, so as to receive loosely the inner ends of the shafts A, and at each end the bore for a short distance is enlarged and a screw-thread cut on the inner surface.

The bore is enlarged enough to loosely receive the collar B, and the screw-threads match into the screw-threads upon the shoulder $b$ of the head-piece or box E. It may be further fastened by a set-screw, as shown in the drawings.

The wheel C and shaft A may be of any desired style and size.

The operation is as follows: When the parts are all put together, then the revolutions of the wheels C cause the shafts A to revolve within the connection D, and also revolves with it the journal H within the box-piece E, and the collar B within the enlarged bore of the connection D.

It will be readily seen that by the union of the connection D and head-piece E a chamber is formed, within which the collar B revolves.

The distance between the wheels can be changed and adjusted by moving the collar and journal along on the shafts A either way, and fastening it by the set-screw $a$.

Upon the outside of the wheels the outer ends of the shafts A are prepared to fit the ordinary journal-box now in use.

By my invention the strength of the axle is not weakened by cutting the shaft in two, for the connection D more than replaces it.

It will be noticed that the long coupling D E E splices the divided axle ends in a manner to bring the bearings of the axle near the inner sides of the wheels, and that said long coupling is adapted to turn independently of or with the shouldered journal-bearings B H and the divided axle, thus reducing the friction of the parts, and giving two separate and distinct journal-bearings in the same coupling.

Having thus described my invention, what I claim as new is—

1. In a divided car-axle, the combination of the independently-moving coupling D E E with the shouldered journal-bearings B H and the divided axle A, substantially as herein set forth.

2. In a divided car-axle, the long coupling D E E, splicing the divided axle ends, the part D having recesses at each end to receive the shouldered journal-bearings B H, and adapted to turn with or independently of said bearings and the divided axle, as herein set forth.

JOHN W. WHITTIC.

In presence of—
C. W. SMITH,
S. J. BILLINGTON.